(12) United States Patent
Kim

(10) Patent No.: US 9,345,078 B2
(45) Date of Patent: May 17, 2016

(54) LED FLUORESCENT LAMP DRIVING DEVICE DRIVEN BY BEING CONNECTED TO LAMP STABILIZER AND LED FLUORESCENT LAMP HAVING THE DRIVING DEVICE INSTALLED THEREIN

(71) Applicant: Jihn Kuk Kim, Seoul (KR)

(72) Inventor: Jihn Kuk Kim, Seoul (KR)

( * ) Notice: Subject to any disclaimer, the term of this patent is extended or adjusted under 35 U.S.C. 154(b) by 0 days.

(21) Appl. No.: 14/371,434

(22) PCT Filed: Jan. 9, 2013

(86) PCT No.: PCT/KR2013/000178
§ 371 (c)(1),
(2) Date: Jul. 9, 2014

(87) PCT Pub. No.: WO2013/105785
PCT Pub. Date: Jul. 18, 2013

(65) Prior Publication Data
US 2015/0008836 A1 Jan. 8, 2015

(30) Foreign Application Priority Data

Jan. 9, 2012 (KR) .................. 10-2012-0002543

(51) Int. Cl.
*H05B 37/02* (2006.01)
*H05B 33/08* (2006.01)
*H05B 41/282* (2006.01)
*F21K 99/00* (2016.01)

(52) U.S. Cl.
CPC .............. *H05B 33/0809* (2013.01); *F21K 9/17* (2013.01); *H05B 33/0803* (2013.01); *H05B 33/0821* (2013.01); *H05B 41/2821* (2013.01); *Y02B 20/348* (2013.01); *Y02B 20/386* (2013.01)

(58) Field of Classification Search
USPC ...... 315/291, 307, 224, 160–161, 200 R, 192
See application file for complete search history.

(56) References Cited

U.S. PATENT DOCUMENTS

| | | | | |
|---|---|---|---|---|
| 6,459,215 B1 * | 10/2002 | Nerone et al. | ............... | 315/291 |
| 6,555,974 B1 * | 4/2003 | Cline et al. | ................... | 315/312 |
| 2008/0290814 A1 * | 11/2008 | Leong et al. | ................. | 315/294 |
| 2011/0260620 A1 * | 10/2011 | Kumada et al. | ................ | 315/97 |
| 2011/0291575 A1 * | 12/2011 | Shiu et al. | .................... | 315/192 |

* cited by examiner

Primary Examiner — Minh D A

(57) ABSTRACT

Recently, there has been a growing emphasis on the importance of green industries for reducing energy consumption. As part of the reduction in energy consumption, LED lamps have been widely distributed and used, but conventional fluorescent lamps made of glass tubes have not been actively replaced with LED fluorescent lamps because the replacement of conventional fluorescent lamps is too difficult, for instance, in order to replace the conventional fluorescent lamps with LED fluorescent lamps, a conventional fluorescent lamp stabilizer provided within the light of the fluorescent lamp has to be removed and an LED converter must be installed again. The LED fluorescent lamp of the present invention is driven by continually using an alternating current power source outputted from a fluorescent lamp stabilizer, and thus the installation of the LED fluorescent lamp can be completed by replacing only a fluorescent lamp made of glass tubes with the fluorescent lamp of the present invention while the conventional light of the fluorescent lamp including the fluorescent lamp stabilizer is used. Furthermore, the LED florescent lamp of the present invention provides the advantage of allowing power consumption to be constant even though an inputted alternating current voltage is considerably increased up to AC 250-260V.

8 Claims, 2 Drawing Sheets

LED FLUORESCENT LAMP DRIVING DEVICE DRIVEN BY BEING CONNECTED TO LAMP STABILIZER AND LED FLUORESCENT LAMP HAVING THE DRIVING DEVICE INSTALLED THEREIN

FIELD OF THE INVENTION

The present invention relates to an LED fluorescent lamp driving device and an LED fluorescent lamp having the driving device installed therein, and more particularly to an LED lamp driving device and an LED fluorescent lamp having the driving device installed therein, which allow a conventional fluorescent lamp to be removed from a conventional fluorescent lamp luminaire having a fluorescent lamp ballast installed therein and replaced with a high-efficiency LED fluorescent lamp.

BACKGROUND

Recently, various types of lighting luminaires including fluorescent lamps are being replaced with LED lamps having similar appearances, commonly usable sockets, and high efficiency. However, LED fluorescent lamps have not become widespread because conventional fluorescent lamp ballasts are installed in existing conventional fluorescent lamp luminaires and they should be inconveniently replaced with LED converters in order to use general LED fluorescent lamps. Therefore, there has been a demand for LED lamps in the shape of fluorescent lamps (i.e., LED fluorescent lamps), which may be installed and used in conventional fluorescent lamp luminaires, replacing conventional glass tube fluorescent lamps therein.

SUMMARY OF THE INVENTION

One object of the present invention is to provide an LED fluorescent lamp driving device and an LED fluorescent lamp having the driving device installed therein, which allow a conventional glass-tube type fluorescent lamp to be only removed from a conventional fluorescent lamp luminaire and an LED fluorescent lamp to be installed and used in place thereof. When a conventional glass-tube type fluorescent lamp is connected to an electronic fluorescent lamp ballast installed in a conventional fluorescent lamp luminaire, a resonant type oscillator of about 45 kHz is driven in the fluorescent lamp ballast so that an alternating current of about 45 kHz flows in the glass-tube type fluorescent lamp and electrons collide with fluorescent materials painted inside the tube to emit light. The electronic ballast and the glass-tube type fluorescent lamp constitute a resonant circuit such that it may resonate at about 45 kHz, which may vary somewhat depending on the fluorescent lamp ballast, to maximize efficiency thereof. Further, when an alternate current (AC) input voltage of the electronic fluorescent lamp ballast is increased, an output voltage thereof is also increased in the same proportion and thus the output thereof cannot be used for the LED fluorescent lamp without taking a special measure. That is, if the output of the electronic fluorescent lamp ballast is to be used for the LED fluorescent lamp, the following conditions should be met:

1. The resonant frequency should not be greatly changed.
2. The power factor of an input power source of the ballast should not be decreased.
3. The power consumption of the LED fluorescent lamp should not be increased even if the AC input voltage is increased.
4. Luminous efficiency should be significantly improved.
5. The input power should be lowered as much as the luminous efficiency of Condition 4 is improved to achieve energy saving.

If the above five conditions are satisfied, LED fluorescent lamps are expected to become widespread because they will be easily substituted without any wiring work on existing ballasts.

The present invention provides an LED fluorescent lamp driving device and an LED fluorescent lamp having the driving device installed therein, wherein the LED driving device may receive an output of an electronic fluorescent lamp ballast to drive the LED fluorescent lamp without reducing the efficiency and power factor of the ballast; the power consumption of the LED fluorescent lamp may not be increased even if an AC input voltage of the ballast is significantly increased; and an input power of the fluorescent lamp ballast may be reduced as much as the luminous efficiency of the LED fluorescent lamp is improved.

When employing an LED fluorescent lamp driving device or an LED fluorescent lamp according to the invention, energy can be saved by about 35% or more while still using existing electronic fluorescent lamp ballasts and luminaires, thereby significantly contributing to the spread of LED fluorescent lamps and energy saving. Further, with respect to the electronic fluorescent lamp ballasts, supply power consumption may be reduced without changing the frequency or the like thereof, thereby reducing the amount of noise as much and extending the lifespan of the ballasts.

DETAILED DESCRIPTION OF THE PREFERRED EMBODIMENTS

Figure 1:
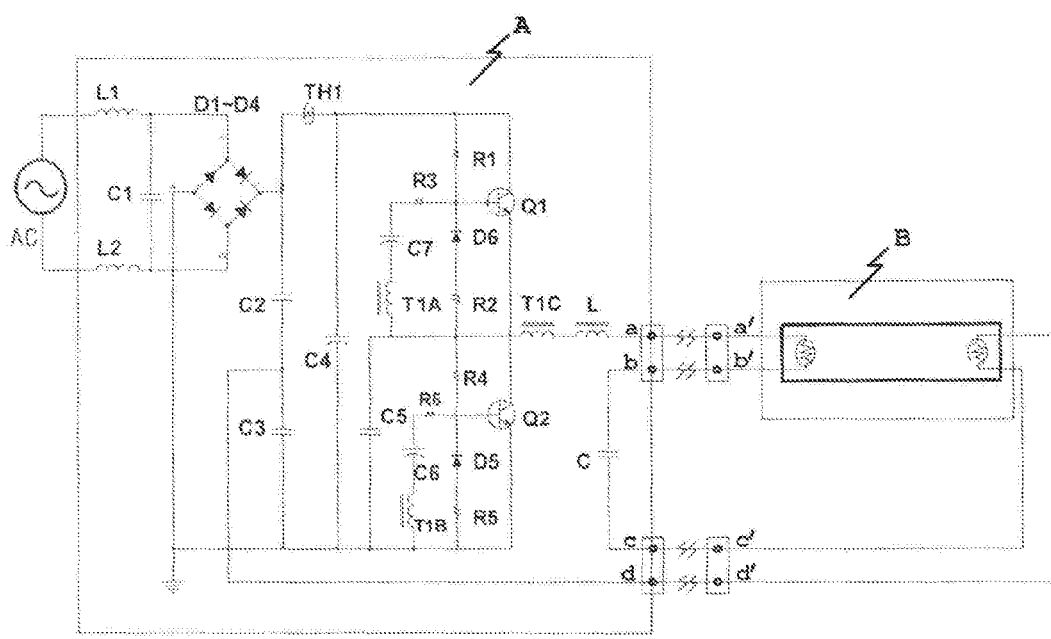
FIG. 1 illustrates the interconnection and operation relationship between an electronic fluorescent lamp ballast and a glass-tube type fluorescent lamp.

The principle of operating an LED fluorescent lamp driving device and an LED fluorescent lamp having the driving device installed therein to achieve the above-described object will be described in detail in conjunction with the accompanying drawings. FIG. 1 illustrates the wiring relationship between an electronic fluorescent lamp ballast and a glass-tube type fluorescent lamp. Between terminals a' and b' connected to terminals a and b of the electronic fluorescent lamp ballast, a filament having a resistance of about 1-2Ω is connected within the glass-tube type fluorescent lamp. Likewise, between terminals c' and d' connected to terminals c and d of the fluorescent lamp ballast, a filament having the same resistance as the one connected between the terminals a' and b' is also arranged within the fluorescent lamp. This is because the filaments should be heated so that electrons may be emitted, in case of the glass-tube type fluorescent lamp. As for the glass-tube type fluorescent lamp, electric currents flow repeatedly along the following paths in FIG. 1:

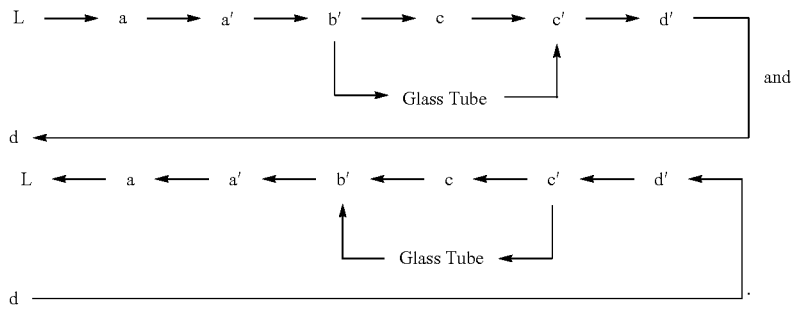

Figure 2:
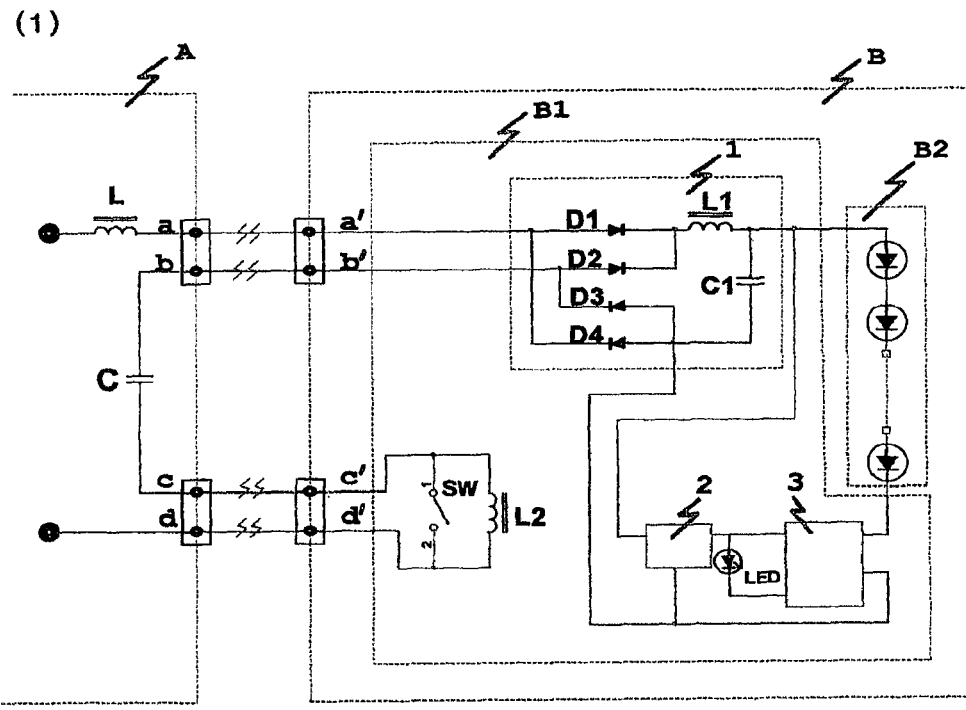
FIG. 2 illustrates circuit block diagrams showing one embodiment of the invention, wherein (1) of FIG. 2 is a circuit diagram of an LED fluorescent lamp according to one embodiment of the invention, which is driven by being connected to an electronic fluorescent lamp ballast, and (2) of FIG. 2 is a circuit diagram of an LED fluorescent lamp according to one embodiment of the invention, which is applicable to a variety of fluorescent lamp ballasts.
Figure 2:
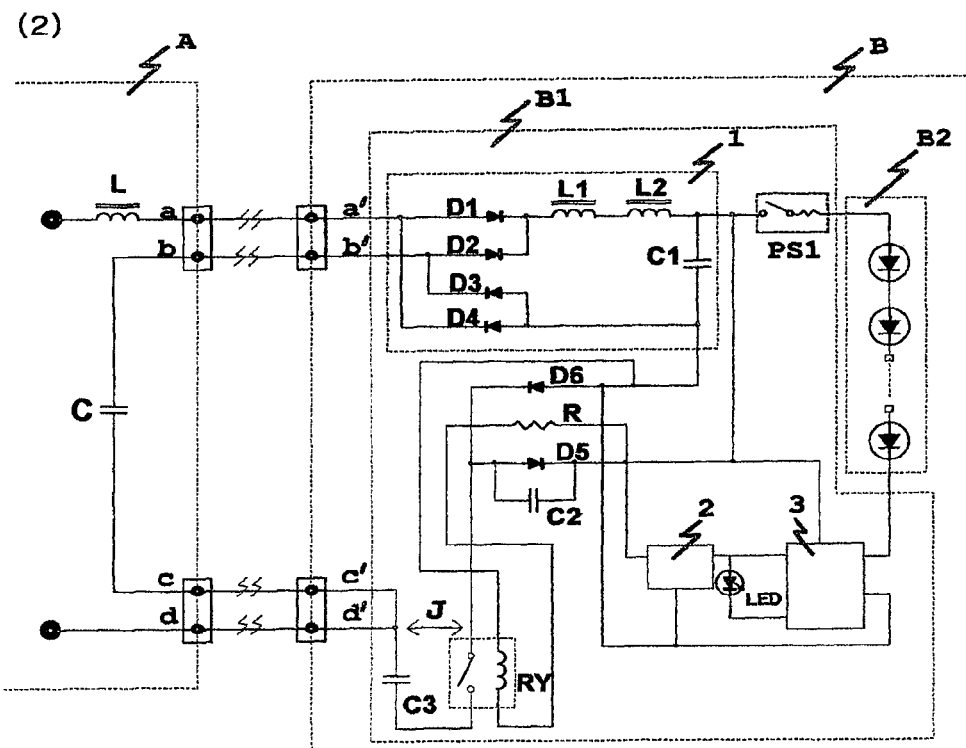

Therefore, the glass tube of the fluorescent lamp may be considered as a kind of a capacitor component. In the LED fluorescent lamp according to the invention, the filament between the terminals a' and b' is removed and a bridge rectification circuit block 1 is added as shown in (1) of FIG. 2, so that a direct current (DC) power obtained therefrom may enable an LED matrix array B2 to emit light. The bridge rectification circuit block 1 is comprised of four diodes D1 to D4 and one capacitor C1. Further, the terminals c' and d' in (1) of FIG. 2 is short-circuited. According to the above configuration, the oscillation frequency of the electronic ballast is considerably increased because there is no capacitive load in the glass-tube type fluorescent lamp. Therefore, it is preferable to arrange a coil L1 for ballasting the frequency and output voltage. Further, there may be provided a plurality of coils and some of them may be short-circuited so that the output voltage of the bridge rectification may be variable. Although a remarkable high-efficiency LED fluorescent lamp may be achieved according to the above configuration, a current limit circuit should be further provided. This is because when an AC input voltage supplied to the fluorescent lamp ballast is increased above a rated voltage, a current current limit circuit block 3. The switching-type current limit circuit block is arranged to be connected in series with the LED matrix array B2. In FIG. 2, LEDs arranged in the LED driving device are intended to display the operating state of the switching-type current limit circuit when the circuit is operated. By configuring the switching-type current limit circuit as above, the current is limited even when some of the plurality of LEDs connected in series in the LED matrix array B2 are short-circuited, so that the power consumption may be reduced and the lifespan of the remaining LEDs may be unaffected. Further, the current is limited even when the voltage of an AC power inputted to the ballast is considerably increased, so that the reliability of the LED fluorescent lamp may remain totally unaffected, and rather the power-saving effect may be enhanced. The above operating principle relates to the case where the LED fluorescent lamp according to the invention is applied to the electronic fluorescent lamp ballast in which a capacitor C for frequency stability and resonance is installed, as shown in (1) of FIG. 2. The paths of a load current in the above case will be discussed below. When an AC power from the fluorescent lamp ballast is outputted from the terminal a and fed back to the terminal d, the load current flows along the following path in the first half-period:

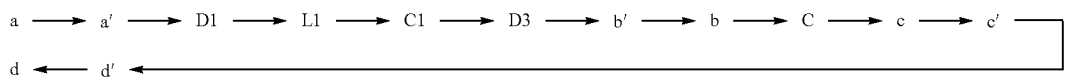

and flows along the following path in the next half-period:

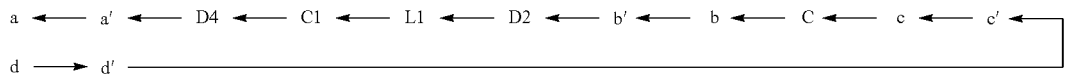

-flowing through the LED fluorescent lamp rises exponentially in case of the LED fluorescent lamp, so that the LED matrix array is eventually destroyed. According to the embodiment in FIG. 2, the LED fluorescent lamp driving device comprises the bridge rectification circuit block 1, a drive power source circuit block 2, and a switching-type Meanwhile, when the terminals a and b of the fluorescent lamp ballast is connected to the terminals c' and d' of the LED fluorescent lamp, and the terminals c and d of the fluorescent lamp ballast is connected to the terminals a' and b' of the LED fluorescent lamp in a crossed manner, the load current flows along the following path in the first half-period:

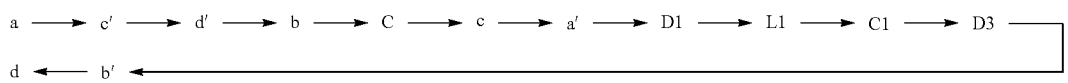

and flows along the following path in the next half-period:

A current flowing through the LED matrix array B2 is not shown in the above current paths because it is known that the current is supplied by discharging the energy charged in the capacitor C1. The flow of the current may be represented as follows:

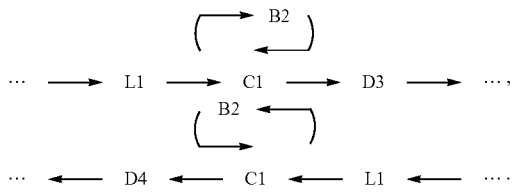

As can be seen from the above, the embodiment in (1) of FIG. 2 is characterized in that the terminals a' and b' and terminals c' and d' of the LED fluorescent lamp are electrically separated from each other. This configuration is intended to prevent electric shock when replacing the LED fluorescent lamp, even if contact is made with a cap terminal at one side while a cap at another side is inserted into the luminaire.

However, the properties of the LED fluorescent lamp configured as shown in (1) of FIG. 2 are greatly varied depending on the capacity of the coil L and resonant capacitor C arranged in the fluorescent lamp ballast. Thus, it is difficult to stably drive the LED fluorescent lamp in correspondence to various types of fluorescent lamp ballasts. Therefore, it is preferable that the LED fluorescent lamp is further provided with a capacitor C2, which overrides the resonant capacitor C arranged in the fluorescent lamp ballast and serves the function thereof. One embodiment thereof is illustrated in (2) of FIG. 2. In the LED fluorescent lamp in (2) of FIG. 2, the terminals c' and d' are electrically short-circuited and then the bridge rectification circuit block 1 is arranged between the terminals a' and b'. The electrically short-circuited terminal c' (or d') is connected to a positive (+) output terminal of the bridge rectification circuit block 1 via a forward diode D5, and to a negative (−) output terminal of the bridge rectification circuit block 1 via another diode D6 in the opposite direction. Then an auxiliary resonant capacitor C2 is arranged at both ends of the forward diode D5 so that the LED matrix array B2, which is configured with serial and parallel connections, is directly driven with a DC output power of the bridge rectification circuit block 1 without using an inverter. The paths of a load current in the above case will be discussed below. When an AC power from the fluorescent lamp ballast is outputted from the terminal a and fed back to the terminal d, the load current flows along the following path in the first half-period:

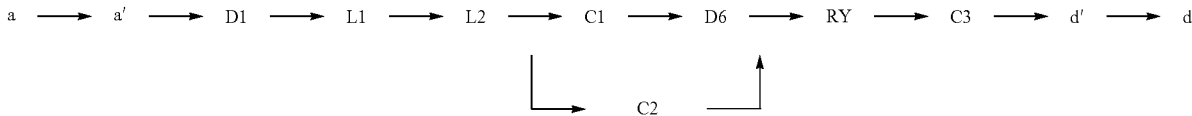

and flows along the following path in the next half-period:

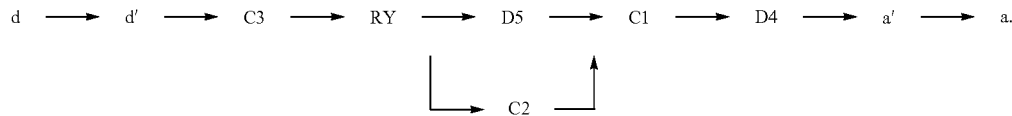

Accordingly, the current does not flow through the resonant capacitor C installed in the fluorescent lamp ballast.

Meanwhile, when an AC power from the fluorescent lamp ballast is outputted from the terminal b and fed back to the terminal c, the load current flows along the following path in the first half-period:

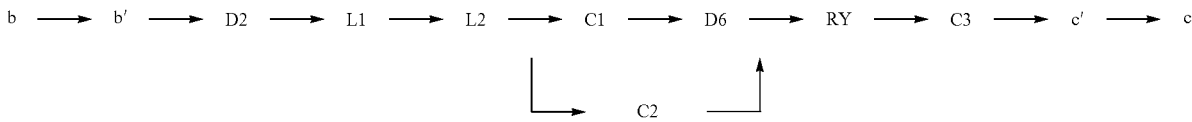

and flows along the following path in the next half-period:

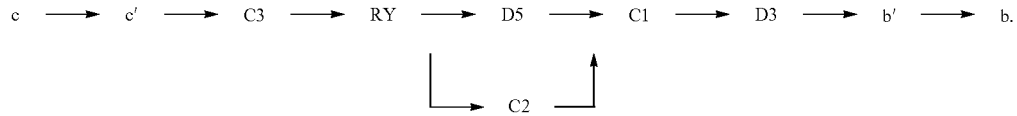

Also in this case, the current does not flow through the resonant capacitor C installed in the fluorescent lamp ballast. Because the terminals c' and d' are electrically short-circuited, the operating principle of the case where the output power from the fluorescent lamp ballast is outputted from the terminal a and fed back to the terminal c is the same as that of the case where it is outputted from the terminal a and fed back to the terminal d, and the operating principle of the case where the output power from the fluorescent lamp ballast is outputted from the terminal b and fed back to the terminal d is the same as that of the case where it is outputted from the terminal b and fed back to the terminal c. In (2) of FIG. 2, a polyswitch PS1 is arranged to be connected in series with the LED matrix array B2 in order to block an overcurrent that may flow through the LED lamp. It is more preferable that the switching-type current limit circuit block 3 connected in series with the LED matrix array B2 may also simultaneously block the current through the LED matrix when overcurrent flow is detected.

As can be seen from the above, the LED fluorescent lamp may be stably driven with various types of fluorescent lamp ballasts when the fifth diode D5, sixth diode D6 and auxiliary resonant capacitor C2 are arranged in the LED fluorescent lamp driving device as shown in (2) of FIG. 2. Further, a capacitor C3 for rejecting low frequencies is connected in a current path to the electrically short-circuited terminals c' and d', so that the LED fluorescent lamp driving device according to the invention may not be operated with a magnetic ballast driven at low frequencies. Furthermore, a relay RY for preventing electric shock is arranged so that the danger of electric shock may be eliminated when replacing the LED fluorescent lamp, even if contact is made with a cap terminal at one side while a cap at another side is inserted into the luminaire. This is because a current for driving the relay RY will be generated to close the contacts of the relay when the cap at the one side is also inserted into the fluorescent lamp luminaire. The capacitor C3 for rejecting low frequencies also serves as a protection against electric shock. If the capacitor C3 for rejecting low frequencies is employed and no additional protection against electric shock is necessary, the relay RY for preventing electric shock is removed. If there is no need to reject low frequencies and no protection against electric shock is particularly required, both ends of the capacitor C3 for rejecting low frequencies and those of the contacts of the relay RY are electrically short-circuited. According to the embodiment in (2) of FIG. 2, it can be seen that the relay RY and capacitor C3 may be removed by employing a jumper lead J.

The paths of a load current in the above case will be discussed below. The load current flows along the following path in the first half-period:

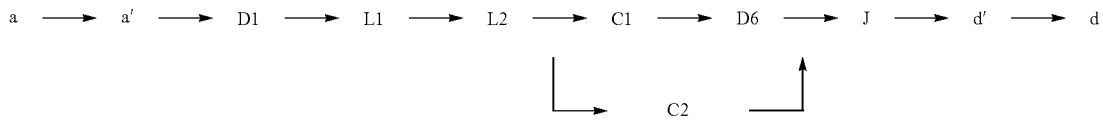

and flows along the following path in the next half-period:

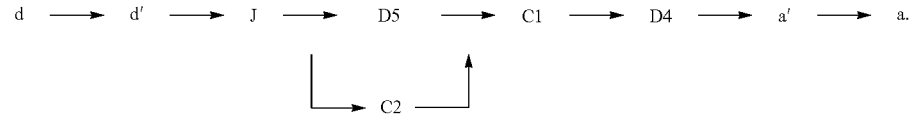

What is claimed is:

1. An LED fluorescent lamp, wherein the lamp is in the shape of a fluorescent lamp comprising four terminals, each two of which are exposed outwardly on a cap;
   a power supplied to two terminals a' and b' on one cap among the four terminals is bridge-rectified by a bridge rectification circuit block 1, and two terminals c' and d' on the other cap are directly short-circuited, so that the terminals on the different caps are electrically separated from each other; and
   an LED matrix array B2 configured with serial and parallel connections is driven with a direct current (DC) output power that is bridge-rectified by the bridge rectification circuit block 1,
   wherein a forward diode D5 is connected from the two short-circuited terminals c' and d' to a positive (+) terminal of the DC output power bridge-rectified by the bridge rectification circuit block 1, a backward diode D6 is connected from the two short-circuited terminals c' and d' to a negative (−) terminal of the bridge-rectified DC output power, and an auxiliary resonant capacitor C2 is connected at both ends of the forward diode D5.

2. The LED fluorescent lamp as claimed in claim 1, further comprising a polyswitch PS1 for blocking an overcurrent, the polyswitch PS1 being connected to an LED fluorescent lamp driving device B1 in series with the LED matrix array B2.

3. An LED fluorescent lamp driving device for driving an LED fluorescent lamp, wherein the lamp is in the shape of a fluorescent lamp comprising four terminals, each two of which are exposed outwardly on a cap;
  a power supplied to two terminals a' and b' on one cap among the four terminals is bridge-rectified by a bridge rectification circuit block 1, and two terminals c' and d' on the other cap are directly short-circuited, so that the terminals on the different caps are electrically separated from each other; and
  an LED matrix array B2 configured with serial and parallel connections is driven with a direct current (DC) output power that is bridge-rectified by the bridge rectification circuit block 1,
  wherein a forward diode D5 is connected from the two short-circuited terminals c' and d' to a positive (+) terminal of the DC output power bridge-rectified by the bridge rectification circuit block 1, a backward diode D6 is connected from the two short-circuited terminals c' and d' to a negative (−) terminal of the bridge-rectified DC output power, and an auxiliary resonant capacitor C2 is connected at both ends of the forward diode D5.

4. The LED fluorescent lamp driving device as claimed in claim 3, wherein a capacitor C3 for rejecting low frequencies is further included in a current path to the two short-circuited terminals c' and d'.

5. The LED fluorescent lamp driving device as claimed in claim 4, wherein a relay RY for preventing electric shock is further included in the current path to the two short-circuited terminals c' and d'.

6. The LED fluorescent lamp driving device as claimed in claim 5, wherein a switching-type current limit circuit block is connected in series with the LED matrix array configured with serial and parallel connections to drive the LED matrix array.

7. The LED fluorescent lamp driving device as claimed in claim 6, further comprising a polyswitch PS1 for blocking an overcurrent, the polyswitch PS1 being connected to the LED fluorescent lamp driving device B1 in series with the LED matrix array B2.

8. The LED fluorescent lamp as claimed in claim 3, further comprising a polyswitch PS1 for blocking an overcurrent, the polyswitch PS1 being connected to an LED fluorescent lamp driving device B1 in series with the LED matrix array B2.

* * * * *